Jan. 13, 1959  I. E. PUDDINGTON  2,868,384
APPARATUS FOR SETTLING FLUID SUSPENSIONS
Filed July 25, 1955
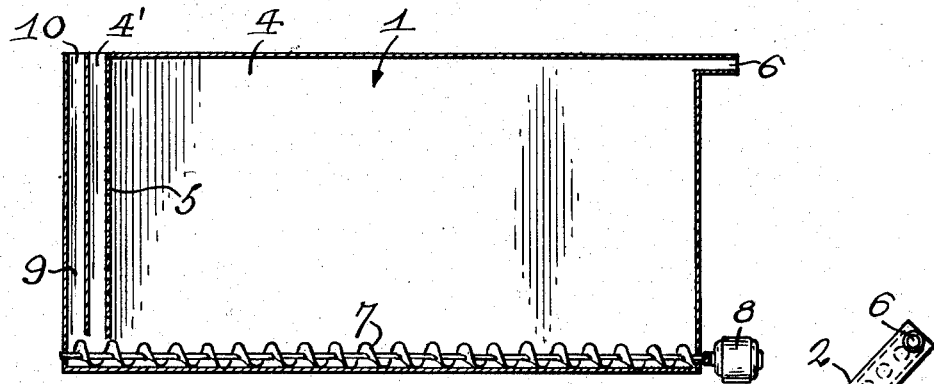
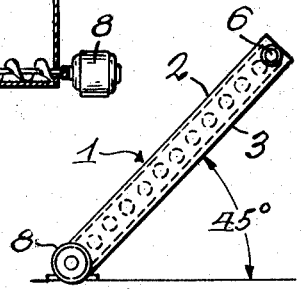
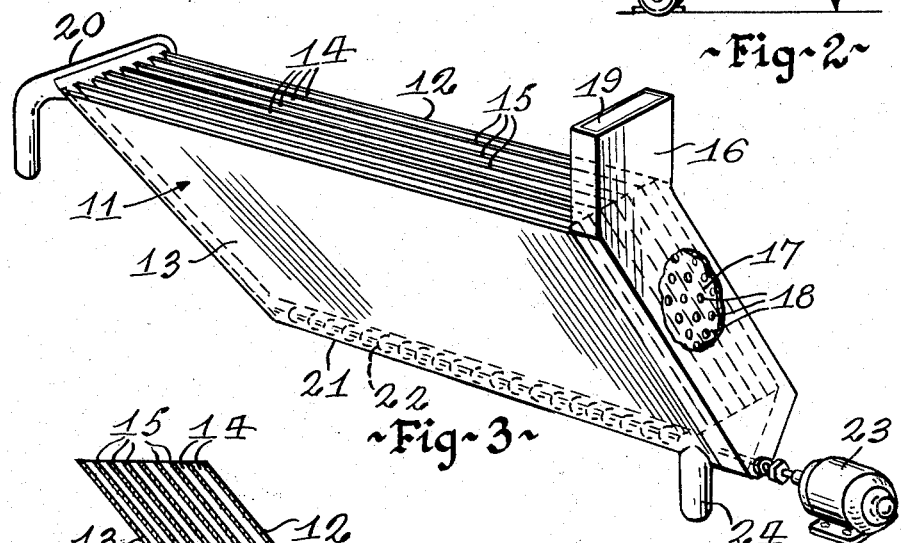
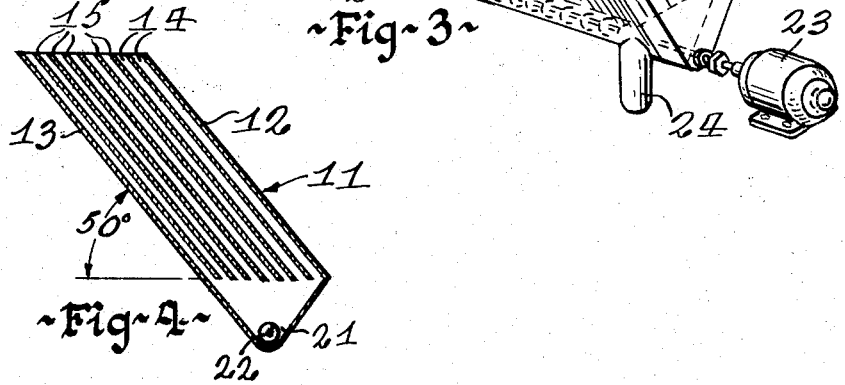
Inventor:
Ira E. Puddington
By Alex. E. MacRae
Attorney.

United States Patent Office 2,868,384
Patented Jan. 13, 1959

2,868,384

APPARATUS FOR SETTLING FLUID SUSPENSIONS

Ira E. Puddington, Ottawa, Ontario, Canada, assignor to National Research Council, Ottawa, Ontario, Canada, a body corporate of Canada Application July 25, 1955, Serial No. 524,119

3 Claims. (Cl. 210—521)

This application relates to improved apparatus for effectively and rapidly removing solid particles or fluid from fluid suspensions, and is a continuation-in-part of copending application, Serial No. 402,916, filed January 8, 1954, now Patent No. 2,793,186

As set forth in such copending application, any fluid suspension wherein the components differ in density produces, when settling or creaming in a tilted container, a convection current due to a fluid density gradient at right angles to the axis of the container caused by the settling of the discontinuous phase in a vertical direction. This convection current causes a pronounced increase in the rate of vertical sedimentation and thus in the rate of separation of the components of the suspension. The intensity of its effect is influenced by concentration of solids in the suspension, angle of tilt of the operating parts of the device, the viscosity of the continuous phase and the density differential between the components.

Since the effect of the convection current is to increase the rate of sedimentation, anything which interferes with it reduces the rate of separation of the components of the suspension or the through-put of the device being used. It is thus essential, if the device is to be used in a continuous manner, that the feeding and discharge of the device must be done so as to interfere as little as possible with the convection current in carrying out the principle set forth above.

There is disclosed in said copending application, several forms of apparatus embodying means for taking advantage of the convection currents as they affect gravity separation.

An object of the present invention is to provide a further improved apparatus of this type wherein a more efficient separation of components of the material under treatment is effected.

The invention, as disclosed in said copending application, utilizes, in a container, a plurality of spaced baffles inclined from the horizontal not less than approximately 40° nor more than approximately 60° and dividing the container into a plurality of angularly disposed classification compartments. Preferably, the inclination of the baffles is in the neighborhood of 45°.

An important characteristic of the present invention is the provision of a greatly increased angular height to width ratio of the settling compartments. It has been found that sedimentation increases greatly and substantially proportionately as such ratio increases. The degree of such ratio depends upon practical factors in the construction of operating or commercial embodiments of the invention. Thus, while improved results are obtained with any increase of angular height to width ratio, it is highly desirable to provide as high a ratio as practically possible. For practical purposes, therefore, such ratio may not greatly exceed 50, and no object would be served in utilizing a ratio substantially below 8. Preferably, such ratio will not be less than approximately 40.

The invention will be described with reference to the accompanying drawing, in which Figure 1 is a side elevation of a simplified form of single unit apparatus in accordance with the invention, Figure 2 is an end elevation of the apparatus shown in Figure 1, Figure 3 is a perspective view of a multi-unit apparatus in accordance with the invention, and Figure 4 is a sectional end elevation of the apparatus shown in Figure 3.

Referring to Figures 1 and 2 of the drawing, 1 is a container arranged for disposition with its side walls 2 and 3 inclined at an angle of 45°, as shown, and within the range of 40° to 60° from the horizontal to provide within the container an inclined settling chamber 4. Means for feeding fluid suspension to the container comprises a suspension receiving compartment 4 at one end of the container and communicating with the interior of the container through a perforated diffusion plate 5. An outlet 6 for the light component of the suspension, such as clear liquid, is provided at the other end of the container. The solids or heavy components, which sink to the bottom of the container, may be discharged by means of a conveyor 7 located along the bottom of the container and driven by a motor 8. As shown, the conveyor 7 is arranged to move the heavy components into a compartment 9 adjacent feed compartment 4 for discharge through a top outlet 10 therein.

It will be observed that, in the apparatus illustrated, the ratio of angular height (i. e., the distance from the bottom to the top of the settling chamber 4, designated at A) to width (i. e., the distance between the interior surfaces of said side walls 2 and 3, designated at B), is approximately 45. The length of the settling chamber 4, i. e., the distance between its end walls, may vary greatly and is shown as about twice its angular height.

Referring to Figures 3 and 4, 11 is a container having side walls 12 and 13 inclined at an angle of approximately 50°. The interior of the container is divided into a plurality of inclined settling compartments 14 of substantially equal volume by means of a plurality of inclined baffles 15 disposed in parallel relation to side walls 12 and 13. Means for feeding fluid suspensions into the compartments 14 comprises a header 16 mounted on one end of container 11 and having a diffusion plate 17 provided with a plurality of openings or perforations 18 communicating with each compartment 14. The header preferably extends above the container to provide a head of fluid suspension therein and has a top inlet 19 for receiving the suspension. Clear liquid or light components are withdrawn from the container through an overflow device 20 located adjacent the other end of the container. Solids or heavy or thickened liquid components, which settle in the conical bottom portion 21 of the chamber, may be withdrawn by means of a conveyor or the like 22, driven by motor 23, for discharge through outlet 24.

As illustrated, the ratio of angular height, i. e., the distance from the bottom to top of each compartment 14, to width, i. e., the distance between the side walls of each compartment as constituted by a side wall 12 or 13 or a baffle 15, is approximately 48.

The following tests of apparatus in accordance with the invention are given by way of example.

Employing an apparatus such as shown in Figures 3 and 4 having 20 settling compartments approximately 2' x 1' x ¼" with a total volume of about 1 cubic foot, 25 gallons of a 2% suspension of potato starch were pumped through the device at the rate of 25 gallons per hour. The starch recovered was 99.5% of the original starch contained in the suspension.

In a second experiment, 8 gallons of a 10% suspension of potato starch were fed through the device at a rate of 36 gallons per hour. The recovery of starch was 98.5%.

The following table sets forth the sedimentation behaviour of a suspension of pentaerythritol in a saturated aqueous solution of itself in tubes of circular cross-section, set at an angle of approximately 45° from the vertical, but having various length to diameter ratios, various diameters, and various lengths.

[Tube diameter=30 mm.]

| Tube Length (cm.) | L/D Ratio | Sedimentation in 600 sec. (cm.) | Angle/Vertical Sedimentation Ratio |
|---|---|---|---|
| 30 | 10.0 | 2.5 | 5.0 |
| 50 | 16.6 | 3.7 | 7.2 |
| 70 | 23.4 | 4.7 | 9.0 |
| 100 | 33.3 | 6.0 | 12.0 |

[Tube diameter=45 mm.]

| | | | |
|---|---|---|---|
| 30 | 6.7 | 1.5 | 3.0 |
| 50 | 11.0 | 2.5 | 5.0 |
| 70 | 15.5 | 3.0 | 6.0 |
| 100 | 20.0 | 3.5 | 7.0 |

[Tube diameter=22 mm.]

| | | | |
|---|---|---|---|
| 30 | 14 | 3.0 | 6.0 |
| 50 | 23 | 4.4 | 8.8 |
| 70 | 32 | 5.2 | 10.4 |
| 90 | 41 | 7.5 | 15.0 |

[Tube diameter=4 mm.]

| | | | |
|---|---|---|---|
| 16 | 40 | 4.2 | 8.4 |

[Tube diameter=9 mm.]

| | | | |
|---|---|---|---|
| 16 | 18 | 2.8 | 5.6 |

It will be apparent that the length of the tubes mentioned in the examples given above designates the angular height of the settling compartment while the diameter designates the width thereof. The advantageous results of the high angular height to width ratio is clearly apparent from the table.

Another feature of the present invention is that the feeding of the suspension into the settling chamber or compartment is at right angles to the direction of the natural convection current therein. The feature has been found to provide satisfactory results in combination with the increased ratio described.

It will be observed that the apparatus disclosed is simple and compact in structure and permits great ease of washing down of the surfaces defining the settling compartments.

I claim:

1. Apparatus for settling fluid suspensions which comprises a container, a plurality of spaced baffles inclined from the horizontal not less than approximately 40° nor more than approximately 60° and dividing said container into a plurality of angularly disposed settling compartments within the container, each said compartment having an angular height to width ratio of at least eight, means forming a feeding chamber at one end of said container and including a diffusion plate defining the adjacent end wall of each said compartment, said diffusion plate having a multiplicity of openings communicating with each said compartment, said feeding chamber being arranged to receive a head of fluid suspension at least equal to the height of said compartments, said openings being substantially uniformly distributed from the bottom to the top of each said compartment and each said opening having a substantially horizontal axis to feed said fluid suspension in a substantially horizontal direction into each said compartment, means for withdrawing a light component of said suspension from said compartments, and means for withdrawing a heavy component of said suspension from the bottom of said compartments.

2. Apparatus for settling fluid suspensions which comprises a container having inclined side walls, a plurality of spaced baffles in said container in parallel relation to said side walls, said baffles and side walls being inclined from the horizontal not less than approximately 40° nor more than approximately 60° and dividing said container into a plurality of angularly disposed settling compartments, each said compartment having an angular height to width ratio of not less than 40, means forming a feeding chamber at one end of said container and including a diffusion plate defining the adjacent end wall of each said compartment, said diffusion plate having a multiplicity of openings communicating with each said compartment, said feeding chamber being arranged to receive a head of fluid suspension at least equal to the height of said compartments, said openings being substantially uniformly distributed from the bottom to the top of each said compartment and each said opening having a substantially horizontal axis to feed said fluid suspension in a substantially horizontal direction into each said compartment, means for withdrawing a light component of said suspension from said compartments, and means for withdrawing a heavy component of said suspension from the bottom of said compartments.

3. Apparatus for settling fluid suspensions which comprises a container having inclined side walls, a plurality of spaced baffles in said container in parallel relation to said side walls, said baffles and side walls being inclined from the horizontal not less than approximately 40° nor more than approximately 60° and dividing said container into a plurality of angularly disposed settling compartments, each said compartment having an angular height to width ratio of not less than 40, said container having an end wall closing one end thereof and abutting the adjacent ends of said baffles, and a diffusion plate defining the other end wall of said compartments and abutting the adjacent ends of said baffles, and means forming a fluid suspension feeding chamber, said diffusion plate constituting one wall of said feeding chamber, said diffusion plate having a multiplicity of openings providing communication between said feeding chamber and each of said compartments, said feeding chamber being arranged to receive a head of fluid suspension at least equal to the height of said compartments, said openings being substantially uniformly distributed from the bottom to the top of each said compartment and each said opening having a substantially horizontal axis to feed said fluid suspension in a substantially horizontal direction into each said compartment, said container having an outlet adjacent said first end wall and leading from said compartments for withdrawing a light component of said suspension, and conveyor means in the bottom portion of said container for withdrawing a heavy component of said suspension.

References Cited in the file of this patent

UNITED STATES PATENTS

| 1,732,386 | Sprockhoff | Oct. 22, 1929 |
| 1,864,911 | Jodeck | June 28, 1932 |
| 2,118,157 | Camp | May 24, 1938 |
| 2,369,194 | Weber | Feb. 13, 1945 |

FOREIGN PATENTS

| 238,007 | Great Britain | Aug. 10, 1925 |
| 1,015,977 | France | Aug. 13, 1952 |